United States Patent
Hao et al.

(10) Patent No.: US 12,384,352 B2
(45) Date of Patent: Aug. 12, 2025

(54) CONSTRAINT HANDLING FOR ELECTRIC MOTOR PARAMETERS

(71) Applicant: GM GLOBAL TECHNOLOGY OPERATIONS LLC, Detroit, MI (US)

(72) Inventors: Lei Hao, Troy, MI (US); Yue-Yun Wang, Troy, MI (US); Bojian Cao, Troy, MI (US); Suresh Gopalakrishnan, Troy, MI (US); Gionata Cimini, Milan (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 18/341,173

(22) Filed: Jun. 26, 2023

(65) Prior Publication Data
US 2024/0425028 A1    Dec. 26, 2024

(51) Int. Cl.
*H02P 21/22* (2016.01)
*B60W 10/08* (2006.01)

(52) U.S. Cl.
CPC ............. *B60W 10/08* (2013.01); *H02P 21/22* (2016.02); *B60W 2710/081* (2013.01); *B60W 2710/083* (2013.01); *B60W 2710/086* (2013.01)

(58) Field of Classification Search
CPC ........... B60W 10/08; B60W 2710/081; B60W 2710/083; B60W 2710/086; H02P 21/22; H02P 29/027
See application file for complete search history.

(56) References Cited

U.S. PATENT DOCUMENTS

| | | | |
|---|---|---|---|
| 10,367,438 B2* | 7/2019 | Araki | H02P 27/06 |
| 11,677,346 B2* | 6/2023 | Li | H02P 21/141 |
| | | | 318/400.02 |
| 2009/0284195 A1* | 11/2009 | Gallegos-Lopez | H02P 21/06 |
| | | | 318/400.07 |
| 2014/0312812 A1* | 10/2014 | Sasaki | H02P 21/0089 |
| | | | 318/400.02 |
| 2021/0211078 A1* | 7/2021 | Iezawa | H02P 27/08 |
| 2022/0131488 A1* | 4/2022 | Harada | H02P 27/08 |
| 2023/0048207 A1* | 2/2023 | Mori | H02P 6/10 |
| 2023/0060458 A1* | 3/2023 | Li | H02P 21/22 |

* cited by examiner

*Primary Examiner* — Thai T Dinh
(74) *Attorney, Agent, or Firm* — CANTOR COLBURN LLP (57) ABSTRACT

Some embodiments disclosed herein are directed to constraint handling for parameters of electric motors. In particular, embodiments of the present disclosure relate to handling constraints for parameters such as current, voltage, and torque associated with an electric motor. Other embodiments may be disclosed or claimed.

20 Claims, 7 Drawing Sheets

CONSTRAINT HANDLING FOR ELECTRIC MOTOR PARAMETERS

INTRODUCTION

The subject disclosure relates to electric motors. In particular, embodiments of the present disclosure relate to handling constraints for parameters such as current, voltage, and torque associated with an electric motor.

Electric motors can generally be described as having a stator and a rotor. The stator is fixed in place and the rotor operates relative to the stator. In electric motors, the stator is typically a current-carrying component of an electric motor, which generates a magnetic field that interacts with the rotor. The rotor of the electric motor includes a magnet and the magnetic field generated by the stator is controlled to rotate the rotor.

The stator of an electric motor may include a series of steel laminations, which are stacked together and contain slots to hold copper wire windings. These windings are used to create a magnetic field that interacts with the magnetic field of the rotor to produce torque. The windings in the stator can be arranged in different ways depending on the specific type of motor. The most common arrangement is a three-phase winding, which includes three sets of windings that are spaced 120 degrees apart around the stator. Each set of windings is connected to a different phase of an alternating current (AC) power supply, which creates a rotating magnetic field when the motor is energized. In a three-phase motor, the windings are typically made up of coils of insulated copper wire. The number of turns in each coil, as well as the thickness of the wire, will depend on the specific motor design and the desired operating characteristics.

The windings in the stator are responsible for creating the magnetic field that interacts with the rotor to produce torque. When the motor is energized, the magnetic field in the stator begins to rotate, which causes the rotor to turn as well. The speed of the motor is determined by the frequency of the power supply and the number of poles in the stator winding.

A control system may be used to monitor different parameters of the electric motor (e.g., current, voltage, torque) and control the operation of the electric motor based on constraints (e.g., maximum allowed current, voltage, or torque). Among other things, embodiments of the present disclosure provide control systems with enhanced handling of constraints for electric motor parameters to help improve the efficiency and performance of the electric motor.

SUMMARY

In one exemplary embodiment, a control system for an electric motor is provided. The control system comprises a processor and memory coupled to the processor. The memory stores instructions that, when executed by the processor, cause the control system to: determine a quadratic current constraint for the electric motor, the quadratic current constraint associated with a maximum phase current for the electric motor; determine a current overload parameter by which the quadratic current constraint may be exceeded for a predetermined period of time; generate a current constraint graph that includes a circular representation of the quadratic current constraint and a current constraint polygon having a vertex and a boundary defined by a plurality of sides, wherein the circular representation of the quadratic current constraint is inscribed within the boundary of the current constraint polygon, and wherein the vertex of the current constraint polygon is based on the current overload parameter; receive, from the electric motor, a phase current measurement; generate, based on the phase current measurement, a d-q axis current measurement; and based on the d-q axis current measurement: transmit a current control command to the electric motor in response to the d-q axis current measurement being within the boundary of the current constraint polygon; or transmit an overload notification to a fault management system in response to the d-q axis current measurement being beyond the boundary of the current constraint polygon.

In addition to one or more of the features described herein, the d-q axis current measurement includes: a d-axis current measurement associated with a d-axis along a direction of a north polarity of a magnet of the electric motor or a north polarity of a magnet field generated by a rotor field winding of the electric motor; and a q-axis current measurement associated with a q-axis that is perpendicular to the d-axis, wherein the q-axis is ninety degrees ahead of the north polarity associated with the d-axis.

In addition to one or more of the features described herein, the phase current measurement is received from a current sensor coupled to the electric motor.

In addition to one or more of the features described herein, determining the current overload parameter is based on overloading a predetermined current range of the electric motor by a predetermined percentage.

In addition to one or more of the features described herein, the predetermined current range is between about 100 A and about 1500 A.

In addition to one or more of the features described herein, the predetermined percentage is between about 10 percent and about 20 percent.

In addition to one or more of the features described herein, the current constraint polygon has at least six sides.

In addition to one or more of the features described herein, the current constraint polygon has at least eight sides.

In addition to one or more of the features described herein, the memory further stores instructions to cause the control system to determine a quadratic voltage constraint for the electric motor, the quadratic voltage constraint associated with a maximum phase voltage for the electric motor. In some embodiments the memory further stores instructions to cause the control system to generate a voltage constraint graph that includes a circular representation of the quadratic voltage constraint and a voltage constraint polygon having a vertex and a boundary defined by a plurality of sides, wherein the circular representation of the quadratic voltage constraint is circumscribed about the boundary of the voltage constraint polygon. In some embodiments the memory further stores instructions to cause the control system to receive, from the electric motor, an inverter bus voltage measurement; generate, using a model predictive controller (MPC), a d-q axis voltage command and, based on the d-q axis voltage command, transmit a control command to an inverter of the electric motor in response to the d-q axis voltage command being within the boundary of the voltage constraint polygon or adjust the d-q axis voltage command to be within the boundary of the voltage constraint polygon in response to the d-q axis voltage command being beyond the boundary of the voltage constraint polygon.

In addition to one or more of the features described herein, the inverter bus voltage measurement is received from a voltage sensor coupled to the electric motor.

In addition to one or more of the features described herein, the maximum phase voltage for the electric motor is between about 100V and about 1600V.

In addition to one or more of the features described herein, the memory further stores instructions to cause the control system to determine a maximum voltage change constraint for a change in voltage of the electric motor over a predetermined period of time.

In addition to one or more of the features described herein, wherein the voltage constraint polygon has at least six sides.

In addition to one or more of the features described herein, wherein the voltage constraint polygon has at least twelve sides.

In addition to one or more of the features described herein, wherein the memory further stores instructions to cause the control system to determine a maximum torque constraint for the electric motor based on a maximum torque envelope for the electric motor.

In addition to one or more of the features described herein, wherein the maximum torque constraint is further determined based on a maximum allowed current change for the d-q axis current measurement.

In addition to one or more of the features described herein, wherein the maximum torque constraint for the electric motor is between about 50 Nm and about 1000 Nm.

In addition to one or more of the features described herein, wherein the memory further stores instructions to cause the control system to determine a torque measurement for the electric motor and, based on the torque measurement: transmit a torque control command to a controller of the electric motor in response to the torque measurement being within a maximum torque constraint; or transmit an overload notification to the fault management system in response to the torque measurement exceeding the maximum torque constraint.

In one exemplary embodiment, an electric motor is provided. The electric motor includes a control system coupled to the electric motor, the control system comprising a processor and memory coupled to the processor and storing instructions. The instructions, when executed by the processor, cause the control system to determine a quadratic current constraint for the electric motor, the quadratic current constraint associated with a maximum phase current for the electric motor. The instructions further cause the control system to determine a current overload parameter by which the quadratic current constraint may be exceeded for a predetermined period of time. The instructions further cause the control system to generate a current constraint graph that includes a circular representation of the quadratic current constraint and a current constraint polygon having a vertex and a boundary defined by a plurality of sides, wherein the circular representation of the quadratic current constraint is inscribed within the boundary of the current constraint polygon, and wherein the vertex of the current constraint polygon is based on the current overload parameter. The instructions further cause the control system to receive, from the electric motor, a phase current measurement and generate, based on the phase current measurement, a d-q axis current measurement. Based on the d-q axis current measurement the control system may transmit a current control command to the electric motor in response to the d-q axis current measurement being within the boundary of the current constraint polygon; or transmit an overload notification to a fault management system in response to the d-q axis current measurement being beyond the boundary of the current constraint polygon.

In one exemplary embodiment, a vehicle is provided. The vehicle includes an electric motor and a control system coupled to electric motor. The control system comprises a processor; and memory coupled to the processor and storing instructions that, when executed by the processor, cause the control system to determine a quadratic current constraint for the electric motor, the quadratic current constraint associated with a maximum phase current for the electric motor. The instructions further cause the control system to determine a current overload parameter by which the quadratic current constraint may be exceeded for a predetermined period of time and to generate a current constraint graph that includes a circular representation of the quadratic current constraint and a current constraint polygon having a vertex and a boundary defined by a plurality of sides, wherein the circular representation of the quadratic current constraint is inscribed within the boundary of the current constraint polygon, and wherein the vertex of the current constraint polygon is based on the current overload parameter. The instructions further cause the control system to receive, from the electric motor, a phase current measurement and generate, based on the phase current measurement, a d-q axis current measurement. Based on the d-q axis current measurement the control system may transmit a current control command to the electric motor in response to the d-q axis current measurement being within the boundary of the current constraint polygon, or transmit an overload notification to a fault management system in response to the d-q axis current measurement being beyond the boundary of the current constraint polygon.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with an exemplary embodiment, a control system for an electric motor is provided. The control system may determine constraints for parameters of the electric motor such as current, voltage, and torque. The control system may further monitor the parameters of the electric motor during operation and transmit commands to the electric motor accordingly, as well as transmit overload notifications to a fault management system in response to determining a parameter exceeds its respective constraint. Embodiments of the disclosure help reduce or eliminate loss of capability associated with the electric motor parameters, thereby improving the efficiency and performance of the electric motor.

Figure 1:
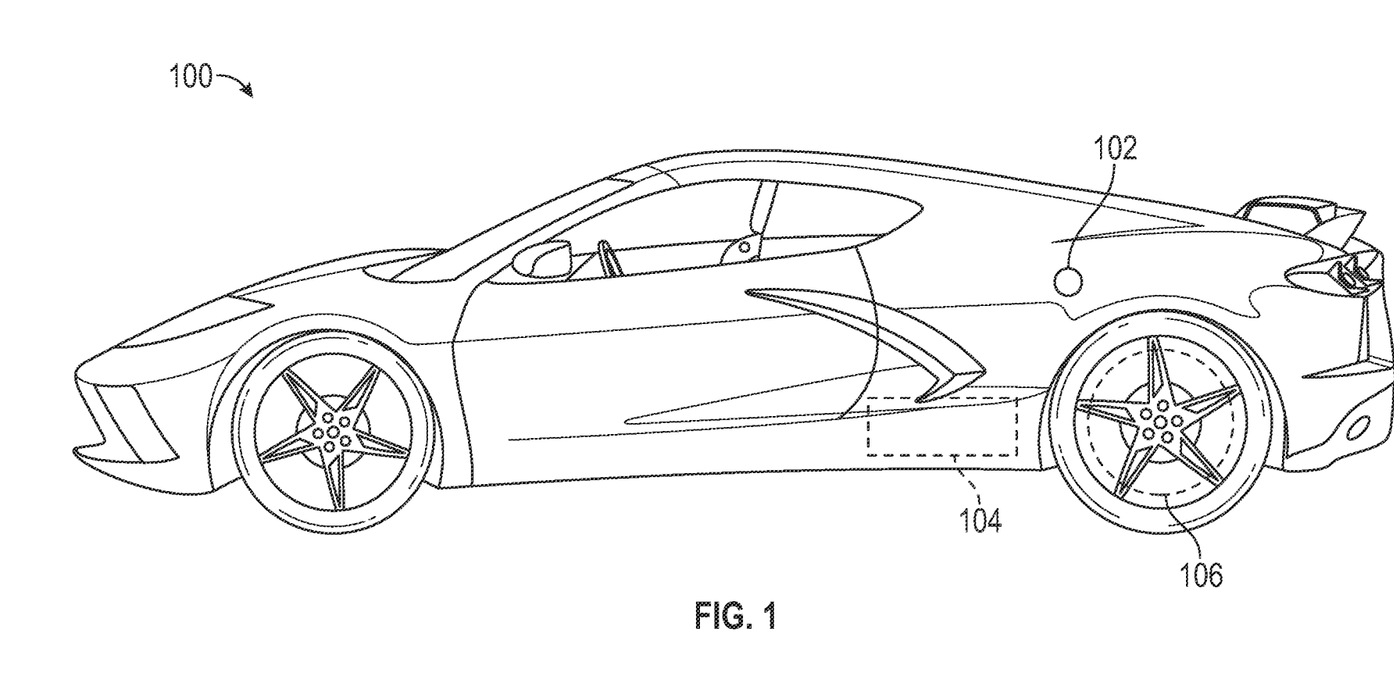
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a charging port 102, a battery 104, and an electric motor 106. In one embodiment, the vehicle 100 is a hybrid vehicle that utilizes both an internal combustion engine and an electric motor. In another embodiment, the vehicle 100 is an electric vehicle that only utilizes electric motors. In exemplary embodiments, the vehicle 100 is configured to be connected, via charging port 102, to a high-voltage power source (i.e., a voltage source of at least 200 volts (V)), which is used to charge the battery 104. The electric motor 106 is configured to receive power from the battery 104 to provide propulsion for the vehicle 100. In exemplary embodiments, the battery 104 is configured to supply direct-current (DC) power to an inverter (not shown), which converts the DC power into three-phase alternating-current (AC) power. The three-phase AC power is supplied to the electric motor 106 to provide propulsion for the vehicle 100.

Figure 2:
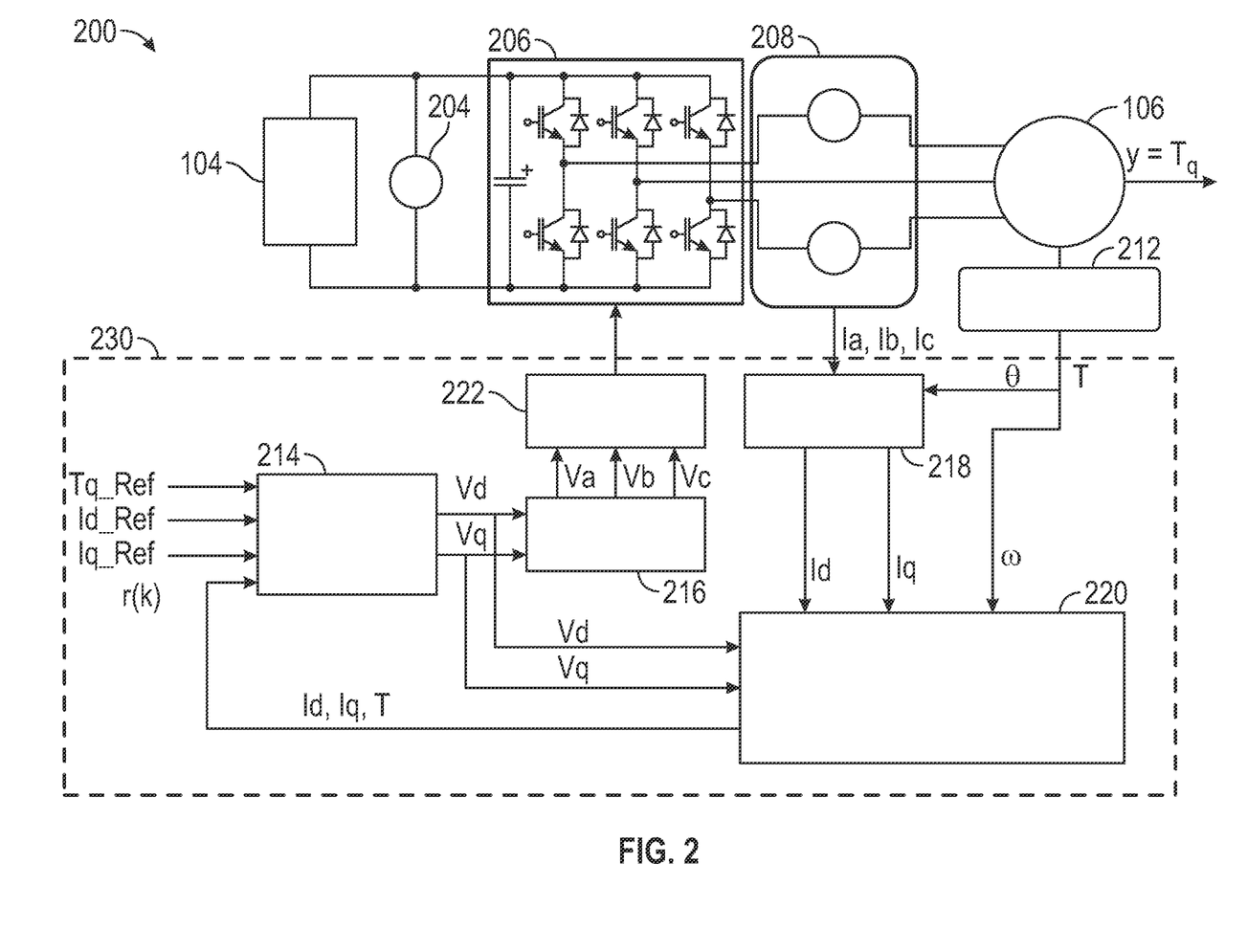
FIG. 2 is a functional block diagram illustrating an example of a system for controlling an electric motor in accordance with embodiments of the present disclosure.

Referring now to FIG. 2, a functional block diagram illustrating an example of system 200 for controlling an electric motor 106 of vehicle 100 in FIG. 1 is shown. Other configurations are possible in alternate embodiments. In this example, system 200 includes a direct current (DC) voltage sensor coupled between battery 104 and power inverter system 206. Current sensors 208 are coupled between the power inverter system 206 and electric motor 106 (a three-phase AC motor in this example). System 200 further includes a speed and/or position sensor 212 coupled to the electric motor 106.

In FIG. 2, functional blocks 214, 216, 218, 220, and 222 illustrate features of a control system 230 coupled to the electric motor 106 in accordance with various embodiments. In this example, control system 230 is coupled to the electric motor 106 to control the operation of the electric motor 106, such as via gate control signals provided to the inverter system 206.

In some exemplary embodiments, the control system 230 includes at least one processor, such as a general processor, a central processing unit, an application-specific integrated circuit (ASIC), a digital signal processor, a field-programmable gate array (FPGA), a digital circuit, an analog circuit, or combinations thereof. In some embodiments, the control system 230 includes a memory in communication with the processor to store data and instructions executable by the processor to retrieve measurements from the electric motor 106 (and sensors coupled thereto) and control the electric motor 106 (e.g., via gate control signals sent to the inverter system 206).

In the example shown in FIG. 2, a DC voltage sensor 204 measures the voltage of the motor drive system (the power inverter 206 and motor 106). Current sensors 208 measure phase currents for the electric motor 106. In the example depicted in FIG. 2, the position and/or speed sensor 212 measures the speed and/or position of the electric motor 106. Some alternate embodiments may be configured without a position and/or speed sensor 212, however, and instead the control system 230 may estimate position or speed based on measured currents.

In the example shown in FIG. 2, torque ($T_q$) may be estimated based on measured current and machine parameters according to:

$$T_q = \frac{3}{2}P(\lambda_m i_q - (L_q - L_d)i_q i_d) \quad \text{(Equation 1)}$$

In the preceding equation, $\lambda_m$ is machine flux linkage. $L_q$ and $L_d$ are machine d and q-axis inductance. The control system 230 uses a d-q frame (rotor reference frame) to represent the electric motor 106. All measured current is transformed to d-q axis current ($i_q$, $i_d$) through an abc-dq transformation process at block 218.

At block 214, the system receives reference inputs r(k) for torque and phase current ($T_{q\_ref}$, $i_{d\_ref}$, $i_{q\_ref}$). At block 214, the control system 230 may utilize a linear time varying model predictive controller (LTV-MPC), or a linear parameter varying model predictive controller (LPV-MPC) in conjunction with an extended Kalman filter (EKF) process.

For measured parameters within their respective constraints, the control system 230 proceeds to generate and transmit control functions to control features of the electric motor 106. For example, the model predictive controller (MPC) in block 214 may determine whether the measured d-q axis current resulting from sensors 208 is within a determined current constraint ($I_{max}$) according to:

$$I_s = \sqrt{(i_d)^2 + (i_q)^2} \leq I_{max}$$

Figure 3A:
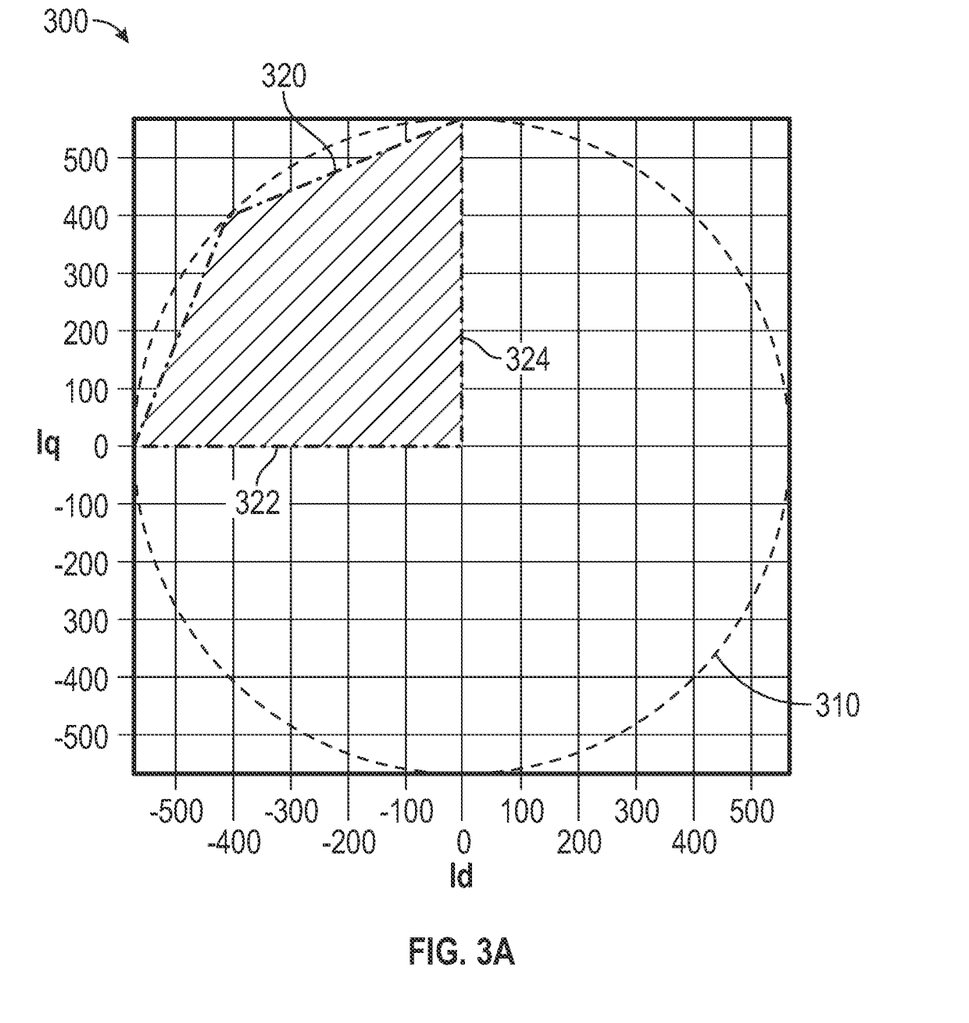
FIG. 3A and FIG. 3B include graphs illustrating examples of current constraint handling in accordance with various aspects of the present disclosure.
Figure 3B:
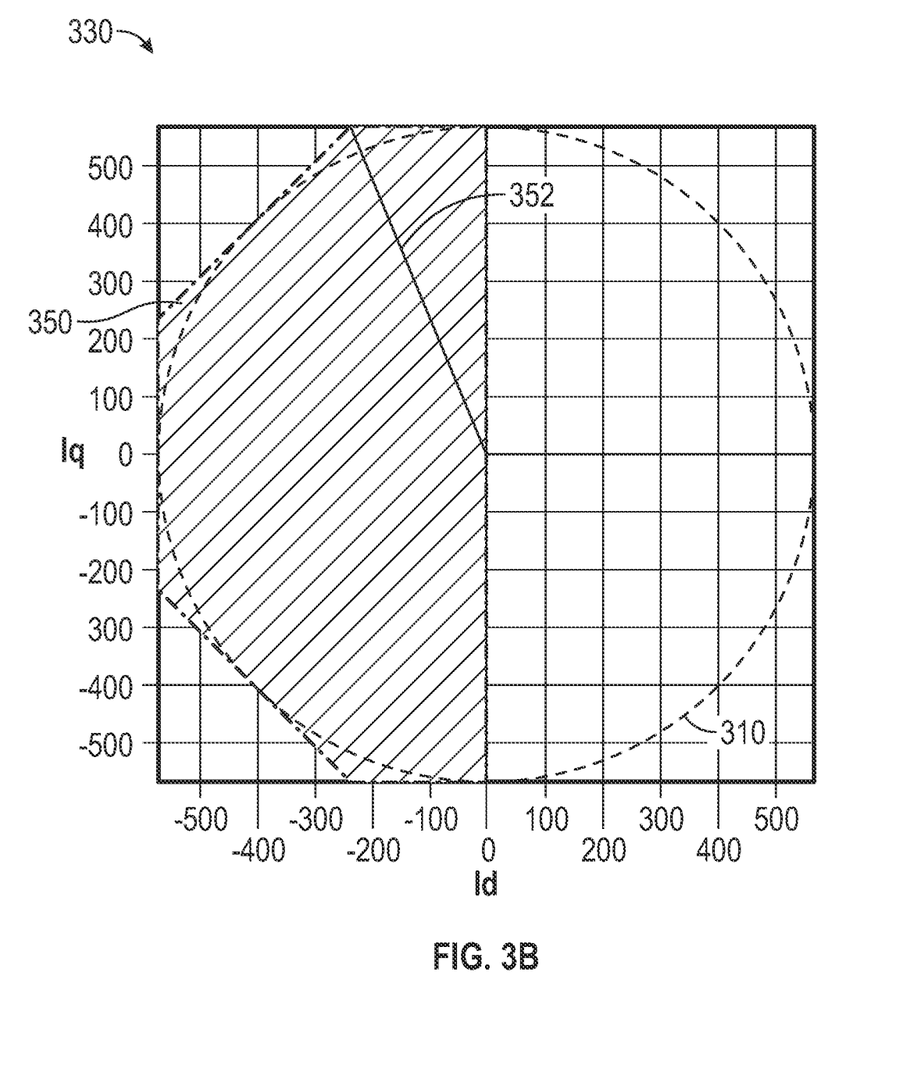

FIG. 3A and FIG. 3B provide graphs illustrating examples of current constraint handling in accordance with embodiments of the present disclosure. In these examples, the system determines a quadratic current constraint 310, referred to above as $I_{max}$, for electric motor 106. The current constraint 310 is associated with a maximum amplitude of phase current for the electric motor 106. The current constraint 310 is a sinewave (measured by current sensors 208) and therefore its waveform can be represented as a circular plot 310 as shown in FIGS. 3A and 3B. In some embodiments, the maximum current for the electric motor (e.g., upon which the quadratic current constraint 310 and current overload parameter are based) may be between about 100 A and about 1500 A. Other ranges may be possible for alternate configurations of electric motors.

In LPV-MPC and LPV-MPC models (e.g., as used at block 214 in FIG. 2) parameter constraints such as quadratic current constraint 310 (as well as constraints for voltage) are represented by a polyhedral approximation. In graph 300 in FIG. 3A, for example, the polyhedral approximation of the current constraint is an eight-sided (octagonal) current constraint polygon 320 (partially shown with four of the eight sides in FIG. 3A) and the quadratic current constraint 310 is circumscribed about the current constraint octagon 320. As can be seen in the graph 300 between $i_d$ (x-axis) and $i_q$ (y-axis), the current constraint polygon 320 only constrains the current of the electric motor to the full range of the quadratic current constraint 310 at the vertexes 322, 324 of polygon 320, but enforces a stricter level of current constraint on the electric motor between the vertexes 322, 324 along the edges of the polygon 320. Consequently, the constraint model in FIG. 3A does not fully utilize the current capability of the electric motor 106, resulting in a significant loss (e.g., 10%) in current capability. Similar inefficiencies may result from quadratic constraints circumscribed about polyhedral approximations for voltage.

In FIG. 3B, by contrast, graph 330 illustrates quadratic current constraint 310 with a current constraint polygon 350

(again an octagon). In this example, the circular quadratic current constraint 310 plot is inscribed within the boundary of the current constraint polygon 350. As shown, the current constraint polygon 350 allows the current of the electric motor to at least reach the quadratic current constraint 310, and to temporarily exceed the quadratic current constraint 310, such as at vertex 352 of the current constraint polygon 350.

In some embodiments, a polyhedral approximation of a parameter constraint (such as current constraint polygon 350 in FIG. 3B) may be generated based on a determined overload parameter associated with an amount by which the parameter may exceed the parameter constraint for a predetermined period of time. For example, in some embodiments, an overload parameter (OV) for a polygon with n sides may be determined according to:

$$OV = 1/\cos(2*\pi)/(2*n)$$

The overload parameter may further be based on overloading the parameter constraint by a predetermined percentage. In some engineering design applications, for example, an overload capability of about 20% may be acceptable. In other embodiments, an overload capability of about 10% may be used. The overload percentage for a particular parameter may further depend on the parameter (e.g., current, voltage, torque) and the manner in which allowing the overload will affect the operation of the electric motor 106.

Embodiments of the present disclosure may utilize polyhedral approximations of a parameter constraint having any number of suitable sides. For example, while polygons with eight sides (octagons) are depicted in the examples shown in FIGS. 3A and 3B, in alternate embodiments polygons with fewer sides (e.g., six sides) or more sides (e.g., 12, 24, 48, etc.) sides may be utilized.

In some embodiments, the system may select a number of sides for a polyhedral approximation of a parameter constraint to help minimize an amount of overload for the parameter (e.g., more sides may result in less overload). The system may also select a number of sides for a polyhedral approximation of a parameter constraint based on available resources of the control system 230, such as processor speed, memory capacity, computation time, and power, since the constraint may be calculated at every control time step.

In some embodiments, the control system 230 may transmit a current control command (e.g., using gate control commands to power inverter 206 in FIG. 2) to control the electric motor in response to the d-q axis current measurement being within the boundary of the current constraint polygon 350. Alternatively, the control system 230 may transmit an overload notification to a fault management system in communication with the control system 230 (not shown in FIG. 2) in response to the d-q axis current measurement being beyond the boundary of the current constraint polygon 350.

At Block 214, the control system 230 generates d-q axis voltage commands $V_d$, $V_q$, which are provided to a phase transformation process at block 216 to generate phase voltages Va, Vb, and Vc for a space vector or pulse width modulation (PWM) process at block 222. At block 222, gate control signals (based on three phase voltages Va, Vb, and Vc as described below) are generated using the PWM process are transmitted to power inverter 206 to control the functionality of the electric motor 106.

At block 220, the control system 230 uses direct ($v_d$, $v_q$), and torque (T) as state feedback for the system. Additionally or alternatively, the control system 230 may use an extended Kalman filter (EKF) process to perform state estimation.

Figure 4A:
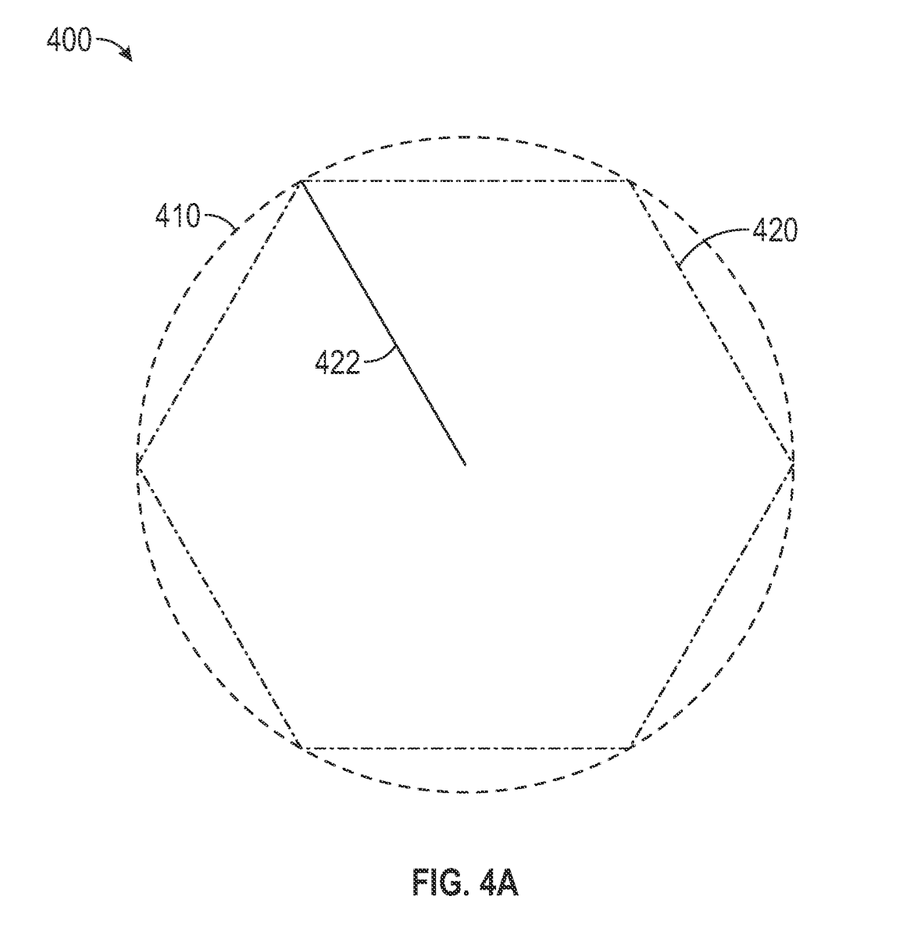
FIG. 4A and FIG. 4B include graphs illustrating examples of voltage constraint handling in accordance with various aspects of the present disclosure.
Figure 4B:
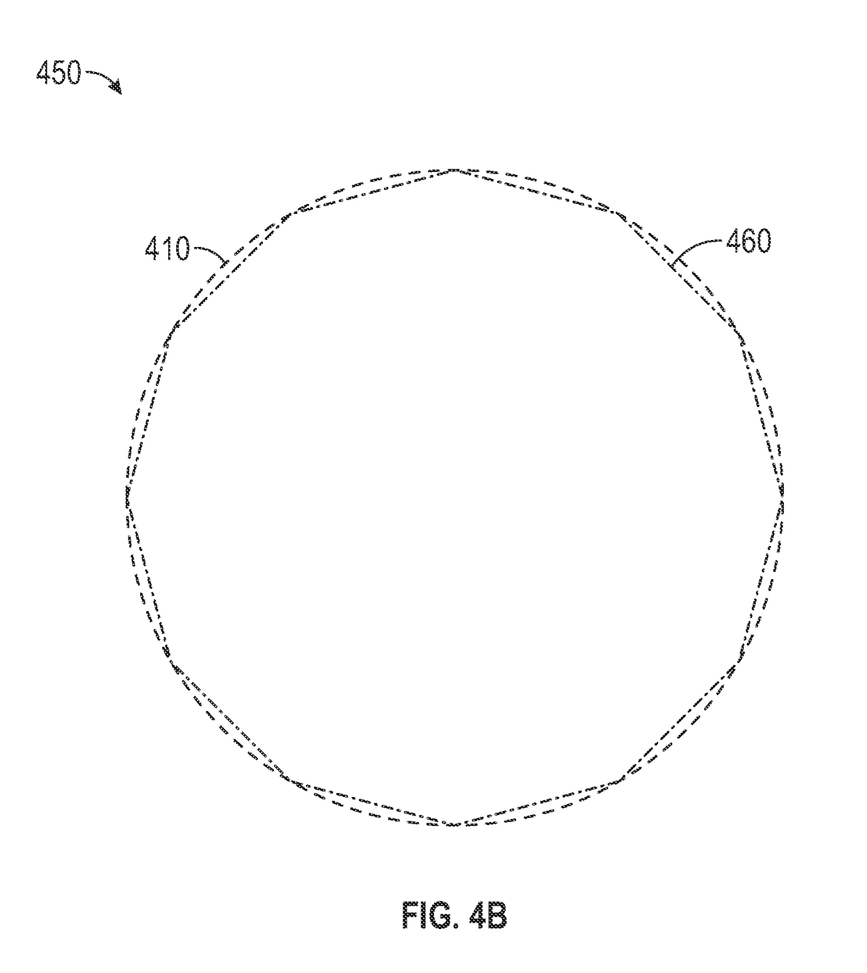

FIG. 4A and FIG. 4B depict graphs illustrating examples of voltage constraint handling in accordance with various aspects of the present disclosure. In FIG. 4A, for example, graph 400 includes a circular representation of a quadratic voltage constraint 410 and a voltage constraint polygon 420 having a boundary defined by its six sides and a vertex 422. The circular representation of the quadratic voltage constraint 410 is circumscribed about the boundary of the voltage constraint polygon 420. In some embodiments, the quadratic voltage constraint 410 may be based on a maximum voltage range of between about 100V and about 1600V for the electric motor 106. Other voltage ranges may be possible for alternate configurations of electric motors.

In some embodiments, the control system 230 outputs the control command of voltage Vd and Vq of the electric motor 106 and determines whether these voltages are within the voltage limits (Vmax) of the voltage constraint polygon 420 according to:

$$V_s = \sqrt{(v_d)^2 + (v_q)^2} \le V_{max}$$

FIG. 4B illustrates a graph 450 showing an alternate embodiment with the circular representation of the quadratic voltage constraint 410 circumscribed about the boundary of the current constraint polygon 460 having twelve sides.

In some embodiments, if the control system 230 determines the voltage Vs is within the limits of the voltage constraint polygon 420 or 450, the determined d-q axis voltages Vd and Vq are used to generate three phase voltages Va, Vb, and Vc to generate gate control commands at block 222 of FIG. 2 to be transmitted to power inverter 206. Alternatively, if the voltage Vs is out of range, a scaling factor is used to reduce the voltage command to be within the boundary of the voltage constraint polygon 420 or 450.

In some embodiments, in response to Vs being out of range, the control system 230 may act to reduce Vd and Vq such that Vs is within the limits of the voltage constraint polygon 420 or 450. In some embodiments, the control system 230 may utilize a scaling factor to reduce Vd and Vq according to:

$$Vd\_new = Factor * Vd \text{ and } Vq\_new = Factor * Vq$$

Where: Factor is calculated as Vmax/Vs.

In some embodiments, it may not be possible to overload the parameter constraint for a particular parameter. The voltage constraints illustrated in FIG. 4A and FIG. 4B, for example, cannot normally be overloaded since the voltage of battery 104 (the source voltage) is fixed. Accordingly, the voltage limit has to be within the circular representation of the quadratic voltage constraint 410. However, as introduced above, embodiments of the present disclosure can help to minimize inefficiencies associated with the polyhedral approximations of the quadratic voltage constraint by generating voltage constraint polygons with a sufficiently large number of sides. Contrasting the six-sided polygon 420 in FIG. 4A with the 12-sided polygon 460 in FIG. 4B for example, the amount of unutilized voltage capacity (represented by the spaces between the quadratic voltage constraint 410 and polygons 420, 460) is reduced by using polygon 460.

In some embodiments, a maximum voltage change constraint (dV_Max) may be determined based on a predicted maximum voltage change and calibration parameters for the electric motor 106. This constraint is directed to a maximum amount a voltage of the electric motor 106 that may change within a predetermined period of time (e.g., one time step). For example, in some embodiments may be determined according to:

$$dV\_Max = \max\{dV\_change, dVMax\_cal\}$$

$$dV = \sqrt{\Delta v_q^2 + \Delta v_d^2}$$

$$\Delta v_q = r_s \Delta i_q + L_d \Delta i_d \Delta \omega_e + \lambda_m \Delta \omega_e$$

$$\Delta v_d = r_s \Delta i_d - L_q \Delta i_q \Delta \omega_e$$

Where: $\Delta i_q$, $\Delta i_d$ are maximum current rising in one time step and $\Delta \omega_e$ is the maximum speed change in wide throttle operation.

The torque of the electric motor 106 is based on the current of the electric motor, and a maximum torque constraint for the electric motor 106 may be determined by the control system 230. In one embodiment, the maximum torque constraint (Tmax) may be determined based on a maximum torque envelope for the electric motor 106. In another embodiment, the maximum torque (Tmax) be determined according to:

$$T\max = \min\{\text{Maximum machine torque envelop}, \Delta T\max\}$$

$$\Delta T_{max} = \frac{3}{2} P(\lambda_m \Delta i_q - (L_q - L_d) \Delta i_q \Delta i_d)$$

Where: $\Delta i_q$, $\Delta i_d$ are the maximum amounts that the respective current levels $i_q$ and $i_d$ may change in a predetermined period of time (e.g., one time step).

In some embodiments, the quadratic torque constraint may be based on a maximum torque range of between about 50 Nm and about 1000 Nm for the electric motor 106. Other torque ranges may be possible for alternate configurations of electric motors.

During operation of the electric motor 106, the control system 230 may determine a torque measurement for the electric motor (e.g., either through direct measurement from a torque sensor or via estimation using Equation 1 as described above). Based on the torque measurement, the control system 230 may transmit a control command to the electric motor in response to the torque measurement being within the boundary of the torque constraint (e.g., determined according to the preceding equation), or transmit an overload notification to the fault management system in response to the torque measurement being beyond the boundary of the torque constraint.

Figure 5:
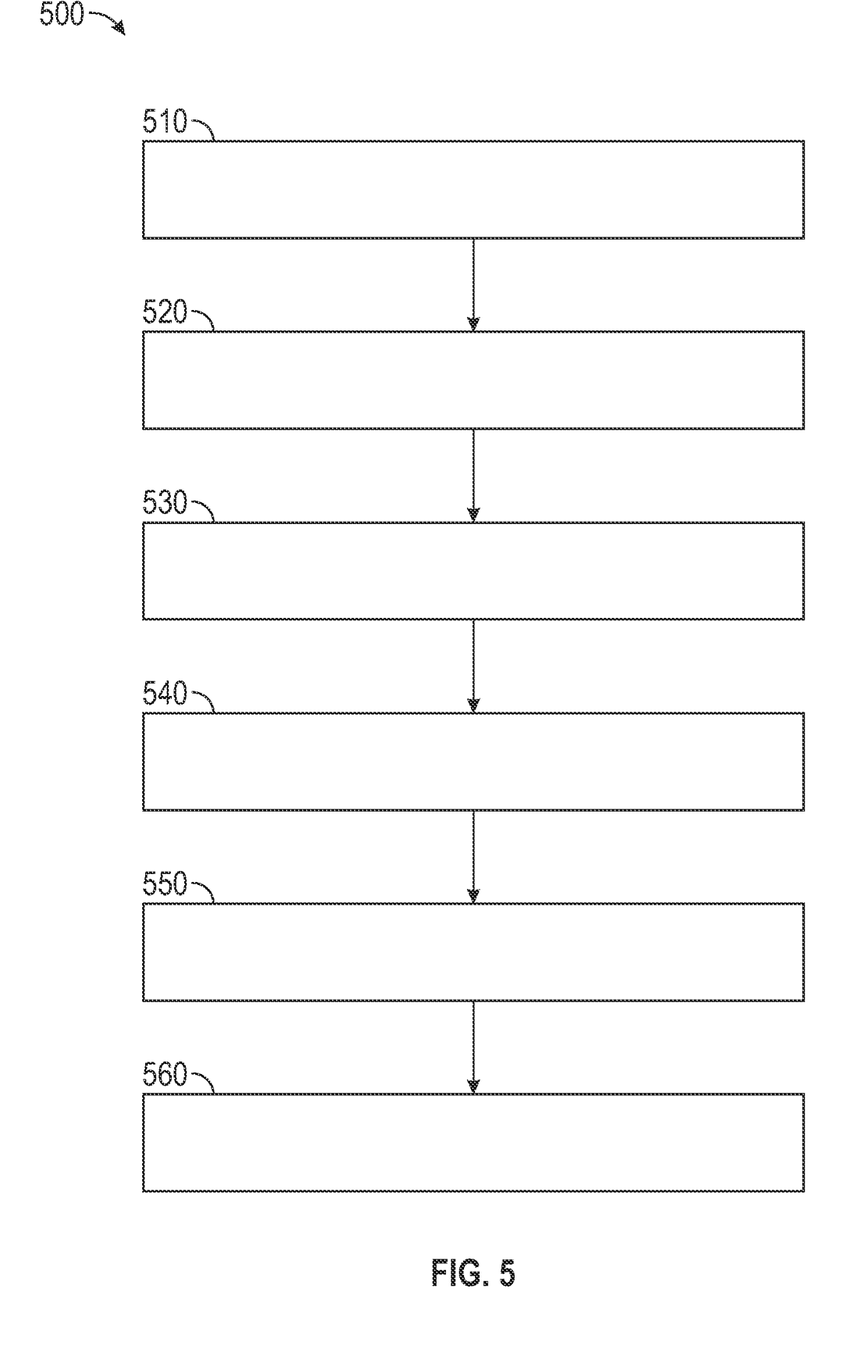
FIG. 5 is a flow diagram illustrating a process in accordance with various aspects of the present disclosure.

Referring now to FIG. 5, an example of a process that may be performed in accordance with various embodiments is shown. The process 500 in FIG. 5 may be performed by any suitable device or combination of devices, such as by a processor of control system 230 executing computer-readable instructions stored in a memory of the control system 230.

In this example, process 500 includes, at 510, determining a quadratic current constraint for an electric motor. The quadratic current constraint may be associated with a maximum phase current for the electric motor.

Process 500 further includes, at 520, determining a current overload parameter by which the quadratic current constraint may be exceeded for a predetermined period of time. Process 500 further includes, at 530, generating a current constraint graph that includes a circular representation of the quadratic current constraint and a current constraint polygon having a vertex and a boundary defined by a plurality of sides. The circular representation of the quadratic current constraint may be inscribed within the boundary of the current constraint polygon, and the vertex of the current constraint polygon may be based on the determined current overload parameter.

Process 500 further includes, at 540, receiving, from the electric motor, a phase current measurement and (at 550), generating, based on the phase current measurement, a d-q axis current measurement. At 560, based on the d-q axis current measurement the control system may either transmit a current control command to the electric motor in response to the d-q axis current measurement being within the boundary of the current constraint polygon, or transmit an overload notification to a fault management system in response to the d-q axis current measurement being beyond the boundary of the current constraint polygon.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A control system for an electric motor, the control system comprising:

a processor; and memory coupled to the processor and storing instructions that, when executed by the processor, cause the control system to:

determine a quadratic current constraint for the electric motor, the quadratic current constraint associated with a maximum phase current for the electric motor;

determine a current overload parameter by which the quadratic current constraint may be exceeded for a predetermined period of time;

generate a current constraint graph that includes a circular representation of the quadratic current constraint and a current constraint polygon having a vertex and a boundary defined by a plurality of sides, wherein the circular representation of the quadratic current constraint is inscribed within the boundary of the current constraint polygon, and wherein the vertex of the current constraint polygon is based on the current overload parameter;

receive a phase current measurement from a current sensor coupled to the electric motor;

generate, based on the phase current measurement, a d-q axis current measurement; and based on the d-q axis current measurement:

transmit a current control command to the electric motor in response to the d-q axis current measurement being within the boundary of the current constraint polygon; or transmit an overload notification to a fault management system in response to the d-q axis current measurement being beyond the boundary of the current constraint polygon.

2. The control system of claim 1, wherein the d-q axis current measurement includes:

a d-axis current measurement associated with a d-axis along a direction of a north polarity of a magnet of the electric motor or a north polarity of a magnet field generated by a rotor field winding of the electric motor; and a q-axis current measurement associated with a q-axis that is perpendicular to the d-axis, wherein the q-axis is ninety degrees ahead of the north polarity associated with the d-axis.

3. The control system of claim 1, current control command includes a gate control signal provided to an inverter system coupled to the electric motor.

4. The control system of claim 1, wherein determining the current overload parameter is based on overloading a predetermined current range of the electric motor by a predetermined percentage.

5. The control system of claim 4, wherein the predetermined current range is between about 100 A and about 1500 A.

6. The control system of claim 4, wherein the predetermined percentage is between about 10 percent and about 20 percent.

7. The control system of claim 1, wherein the current constraint polygon has at least six sides.

8. The control system of claim 7, wherein the current constraint polygon has at least eight sides.

9. The control system of claim 1, wherein the memory further stores instructions to cause the control system to:

determine a quadratic voltage constraint for the electric motor, the quadratic voltage constraint associated with a maximum phase voltage for the electric motor;

generate a voltage constraint graph that includes a circular representation of the quadratic voltage constraint and a voltage constraint polygon having a vertex and a boundary defined by a plurality of sides, wherein the circular representation of the quadratic voltage constraint is circumscribed about the boundary of the voltage constraint polygon;

receive, from the electric motor, an inverter bus voltage measurement;

generate, using a model predictive controller (MPC), a d-q axis voltage command; and based on the d-q axis voltage command:

transmit a control command to an inverter of the electric motor in response to the d-q axis voltage command being within the boundary of the voltage constraint polygon; or adjust the d-q axis voltage command to be within the boundary of the voltage constraint polygon in response to the d-q axis voltage command being beyond the boundary of the voltage constraint polygon.

10. The control system of claim 9, wherein the inverter bus voltage measurement is received from a voltage sensor coupled to the electric motor.

11. The control system of claim 9, wherein the maximum phase voltage for the electric motor is between about 100V and about 1600V.

12. The control system of claim 9, wherein the memory further stores instructions to cause the control system to determine a maximum voltage change constraint for a change in voltage of the electric motor over a predetermined period of time.

13. The control system of claim 12, wherein the voltage constraint polygon has at least twelve sides.

14. The control system of claim 9, wherein the voltage constraint polygon has at least six sides.

15. The control system of claim 1, wherein the memory further stores instructions to cause the control system to determine a maximum torque constraint for the electric motor based on a maximum torque envelope for the electric motor.

16. The control system of claim 15, wherein the maximum torque constraint is further determined based on a maximum allowed current change for the d-q axis current measurement.

17. The control system of claim 15, wherein the maximum torque constraint for the electric motor is between about 50 Nm and about 1000 Nm.

18. The control system of claim 1, wherein the memory further stores instructions to cause the control system to determine a torque measurement for the electric motor, and:

transmit a torque control command to a controller of the electric motor in response to the torque measurement being within a maximum torque constraint; or transmit an overload notification to the fault management system in response to the torque measurement exceeding the maximum torque constraint.

19. An electric motor, comprising:

a control system coupled to the electric motor, the control system comprising:

a processor; and memory coupled to the processor and storing instructions that, when executed by the processor, cause the control system to:

determine a quadratic current constraint for the electric motor, the quadratic current constraint associated with a maximum phase current for the electric motor;

determine a current overload parameter by which the quadratic current constraint may be exceeded for a predetermined period of time;

generate a current constraint graph that includes a circular representation of the quadratic current constraint and a current constraint polygon having a vertex and a boundary defined by a plurality of sides, wherein the circular representation of the quadratic current constraint is inscribed within the boundary of the current constraint polygon, and wherein the vertex of the current constraint polygon is based on the current overload parameter;

receive a phase current measurement from a current sensor coupled to the electric motor;

generate, based on the phase current measurement, a d-q axis current measurement; and based on the d-q axis current measurement:
 transmit a current control command to the electric motor in response to the d-q axis current measurement being within the boundary of the current constraint polygon; or
 transmit an overload notification to a fault management system in response to the d-q axis current measurement being beyond the boundary of the current constraint polygon.

20. A vehicle comprising:

an electric motor;

a current sensor coupled to the electric motor; and a control system coupled to electric motor, the control system comprising:
 a processor; and
 memory coupled to the processor and storing instructions that, when executed by the processor, cause the control system to:
 determine a quadratic current constraint for the electric motor, the quadratic current constraint associated with a maximum phase current for the electric motor;
 determine a current overload parameter by which the quadratic current constraint may be exceeded for a predetermined period of time;
 generate a current constraint graph that includes a circular representation of the quadratic current constraint and a current constraint polygon having a vertex and a boundary defined by a plurality of sides, wherein the circular representation of the quadratic current constraint is inscribed within the boundary of the current constraint polygon, and wherein the vertex of the current constraint polygon is based on the current overload parameter;
 receive a phase current measurement from the current sensor;
 generate, based on the phase current measurement, a d-q axis current measurement; and
 based on the d-q axis current measurement:
  transmit a current control command to the electric motor in response to the d-q axis current measurement being within the boundary of the current constraint polygon; or
  transmit an overload notification to a fault management system in response to the d-q axis current measurement being beyond the boundary of the current constraint polygon.

* * * * *